(12) United States Patent
Russell et al.

(10) Patent No.: US 7,677,480 B2
(45) Date of Patent: Mar. 16, 2010

(54) ENCLOSURES FOR FLUIDIC OSCILLATORS

(75) Inventors: Gregory Russell, Baltimore, MD (US); Keith Berning, Jessup, MD (US); Russell D. Hester, Odenton, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 395 days.

(21) Appl. No.: 11/245,396

(22) Filed: Oct. 6, 2005

(65) Prior Publication Data

US 2006/0108442 A1 May 25, 2006

Related U.S. Application Data

(63) Continuation-in-part of application No. 10/673,727, filed on Sep. 29, 2003, now Pat. No. 7,111,800.

(51) Int. Cl.
*B05B 1/08* (2006.01)
*B05B 1/04* (2006.01)
*F15C 1/06* (2006.01)

(52) U.S. Cl. ............... 239/589.1; 239/593; 137/833

(58) Field of Classification Search ........... 239/589.1, 239/284.1, 284.2, 394, 593, 597, 592, 596, 239/600, 601; 137/833, 803, 808
See application file for complete search history.

(56) References Cited

U.S. PATENT DOCUMENTS

| | | | |
|---|---|---|---|
| 3,185,166 A | 5/1965 | Horton | 137/81.5 |
| 3,563,462 A | 2/1971 | Bauer | 239/456 |
| 4,052,002 A | 10/1977 | Stouffer | 239/4 |
| 4,151,955 A | 5/1979 | Stouffer | 239/11 |
| 4,157,161 A | 6/1979 | Bauer | 239/11 |
| 4,231,519 A | 11/1980 | Bauer | 239/4 |
| 4,398,664 A | 8/1983 | Stouffer | 239/11 |
| 4,463,904 A | 8/1984 | Bray | 239/284 |
| 4,508,267 A | 4/1985 | Stouffer | 239/11 |
| 4,562,867 A | 1/1986 | Stouffer | 137/811 |
| 4,645,126 A | 2/1987 | Bray | 239/11 |
| 5,035,361 A | 7/1991 | Stouffer | 239/589.1 |
| 5,181,660 A | 1/1993 | Stouffer et al. | 239/589.1 |
| 5,213,269 A | 5/1993 | Srinath et al. | 239/589.1 |
| 5,749,525 A | 5/1998 | Stouffer | 239/284.1 |
| 5,820,034 A | 10/1998 | Hess | 239/589.1 |
| 5,845,845 A | 12/1998 | Merke et al. | 239/1 |
| 5,906,317 A | 5/1999 | Srinath | 239/284.1 |
| 5,971,301 A | 10/1999 | Stouffer et al. | 239/589.1 |
| 6,062,491 A | 5/2000 | Hahn et al. | 239/284.2 |
| 6,186,409 B1 | 2/2001 | Srinath et al. | 239/1 |
| 6,240,945 B1 | 6/2001 | Srinath et al. | 137/14 |

(Continued)

*Primary Examiner*—Darren W Gorman
(74) *Attorney, Agent, or Firm*—Larry J. Guffey (57) ABSTRACT

For those spray applications that use a fluidic oscillator of the type that generates a spray by having a pressurized liquid flow through the oscillator and exhaust into a surrounding environment, and where such an oscillator has a boundary surface which has fabricated into it a channel in the form of what is referred to herein as fluidic circuit, an improved enclosure for this oscillator includes: a body having an interior and an exterior surface, wherein a portion of this interior surface is configured to attach to the oscillator boundary surface so as to form with the oscillator's channel an enclosed pathway through which the to-be-sprayed liquid may flow, and wherein a segment of this interior surface is configured so as to yield specified properties of the resulting spray.

4 Claims, 12 Drawing Sheets

U.S. PATENT DOCUMENTS

| | | |
|---|---|---|
| 6,253,782 B1 | 7/2001 | Raghu ......................... 137/14 |
| RE38,013 E | 3/2003 | Stouffer ................... 239/284.1 |
| 6,805,164 B2 | 10/2004 | Stouffer |
| 2003/0234303 A1* | 12/2003 | Berning et al. ........... 239/589.1 |
| 2004/0164189 A1 | 8/2004 | Berning et al. ........... 239/589.1 |
| 2004/0227021 A1 | 11/2004 | Romack et al. .......... 239/589.1 |

* cited by examiner

SECTION B-B
FIG. 7B

SECTION A-A
FIG. 7C

SECTION A-A
FIG. 9C

SECTION A-A
FIG. 13A

FIG. 13B

SECTION A-A ASSEMBLED
FIG. 13C

ENCLOSURES FOR FLUIDIC OSCILLATORS

CROSS-REFERENCE TO RELATED APPLICATION

This application is a continuation-in-part of applicants' patent application U.S. Ser. No. 10/673,727, filed Sep. 29, 2003, and titled "Fluid Spray Apparatus," which issued as U.S. Pat. No. 7,111,800 on Jul. 12, 2005.

BACKGROUND OF THE INVENTION

1. Field of the Invention

This invention relates to fluid handling processes and apparatus. More particularly, this invention relates to new methods and apparatus for enclosing fluidic oscillators or inserts so as to improve their performance.

2. Description of the Related Art

Fluidic inserts or oscillators are well known for their ability to provide a wide range of distinctive liquid sprays. The distinctiveness of these sprays is due to the fact that they are characterized by being oscillatory in nature, as compared to the relatively steady state flows that are emitted from standard spray nozzles.

Figure 1:
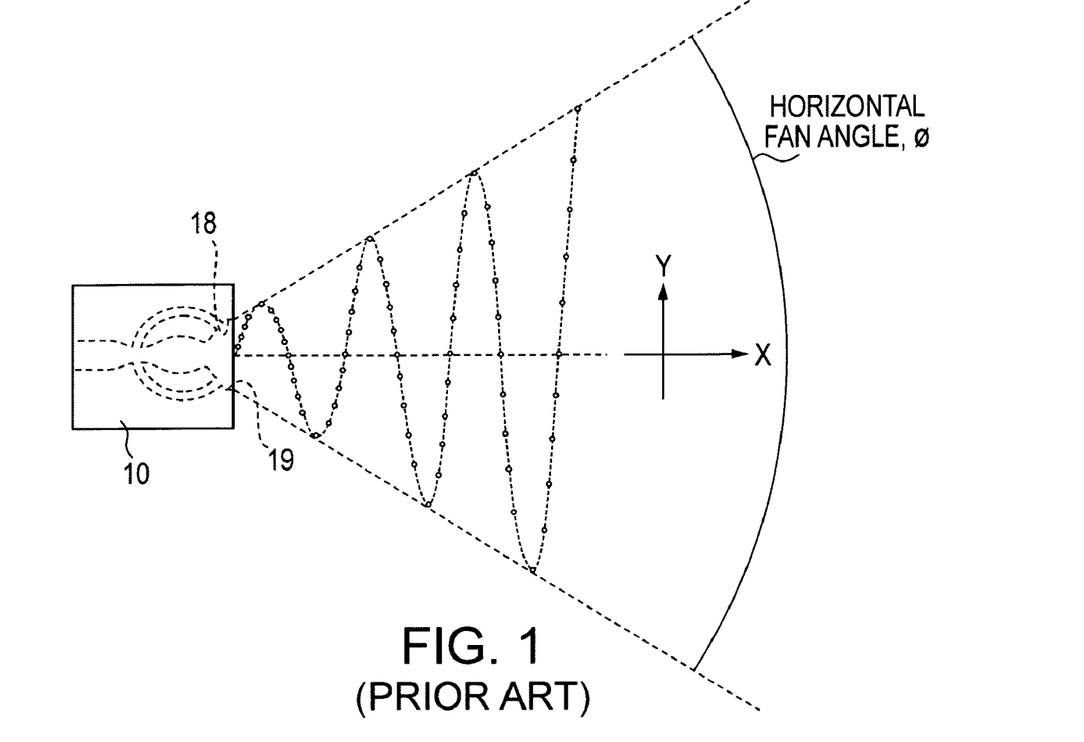

FIG. 1 from U.S. Pat. No. 4,052,002 (Stouffer & Bray) demonstrates the oscillatory nature of the spray from a typical fluidic oscillator. It shows what can be considered to be the essentially temporally varying, two-dimensional, planar flow pattern (i.e., in the x-y plane of the oscillator, and assuming that the width of the oscillator in the z-direction is large in comparison to its throat or outlet dimension) of a liquid jet or spray that issues from the oscillator into a surrounding gaseous environment and breaks into droplets which are distributed transversely (i.e., in the y-direction) to the jet's generally x-direction of flow. Such spray patterns may be described by the definable characteristics of their droplets (e.g., the volume flow rate of the spray, the spray's area of coverage, the spatial distribution of droplets in planes perpendicular to the direction of flow of the spray and at various distances in front of the oscillator's outlet, the average droplet velocities, the average size of the droplets, and the frequency at which the droplets impact on an obstacle in the path of the spray).

A fluidic insert is generally thought of as a thin, rectangular member that is molded or fabricated from plastic and has an especially-designed, uniform depth, liquid flow channel fabricated into either its broader top or bottom surface, and sometimes both (assuming that this fluidic insert is of the standard type that is to be inserted into the cavity of a housing whose inner walls are configured to form a liquid-tight seal around the insert and form an outside wall for the insert's boundary surface/s which contain the especially designed flow channels). See FIG. 2A. Pressurized liquid enters such an insert and is sprayed from it.

Although it is more practical from a manufacturing standpoint to construct these inserts as thin rectangular members with flow channels in their top or bottom surfaces, it should be recognized that they can be constructed so that their liquid flow channels are placed practically anywhere (e.g., on a plane that passes though the member's center) within the member's body; in such instances the insert would have a clearly defined channel inlet and outlet. For example, see FIG. 2B from U.S. Pat. No. 5,820,034 (Hess) which shows a two-part (50a, 50b), fluidic insert whose exterior surface is cylindrical so that this insert can be fitted into a similarly shaped housing (72).

Additionally, it should be recognized that these flow channels need not be of a uniform depth. For example, see U.S. Pat. No. 4,463,904 (Bray), U.S. Pat. No. 4,645,126 (Bray) and RE38,013 (Stouffer) for fluidic oscillators in which the bottom surfaces of these channels are discretely and uniformly sloped so as to impact the ways in which the sprays from these oscillators spread as the move away from the oscillator's outlet.

There are many well known designs of fluidic circuits that are suitable for use with such fluidic inserts. Many of these have some common features, including: (a) at least one power nozzle configured to accelerate the movement of the liquid that flows under pressure through the insert, (b) an interaction chamber through which the liquid flows and in which the flow phenomena is initiated that will eventually lead to the spray from the insert being of an oscillating nature, (c) an liquid inlet, (d) a pathway that connects the inlet and the power nozzle/s, and (e) an outlet or throat from which the liquid sprays from the insert.

Examples of fluidic circuits may be found in many patents, including U.S. Pat. No. 3,185,166 (Horton & Bowles), U.S. Pat. No. 3,563,462 (Bauer), U.S. Pat. No. 4,052,002 (Stouffer & Bray), U.S. Pat. No. 4,151,955 (Stouffer), U.S. Pat. No. 4,157,161 (Bauer), U.S. Pat. No. 4,231,519 (Stouffer), which was reissued as RE 33,158, U.S. Pat. No. 4,508,267 (Stouffer), U.S. Pat. No. 5,035,361 (Stouffer), U.S. Pat. No. 5,213,269 (Srinath), U.S. Pat. No. 5,971,301 (Stouffer), U.S. Pat. No. 6,186,409 (Srinath) and U.S. Pat. No. 6,253,782 (Raghu).

Figure 2A:
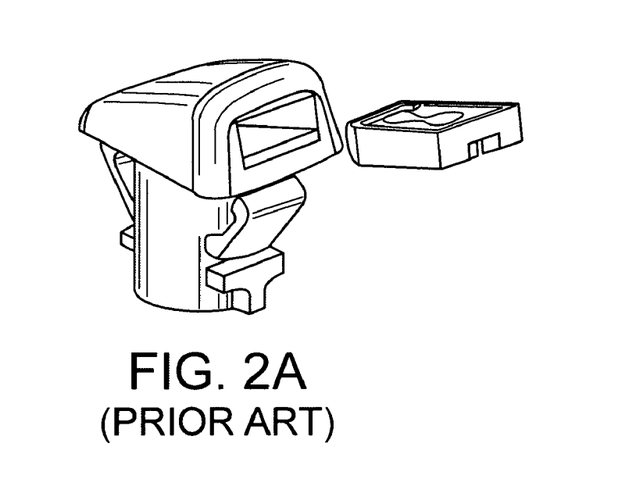
Figure 2B:
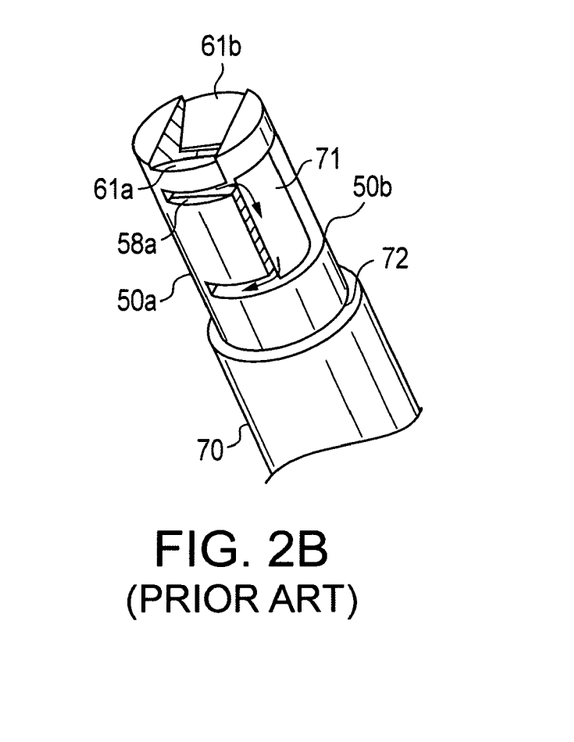

Despite much prior art relating to the development of fluidic circuits, the nature of the housings or enclosures that surround fluidic oscillators have not changed much over the years. For example, FIG. 2A shows a housing that was developed for automotive windshield washing applications—one of the first areas in which such fluidic inserts were extensively used. A fluidic oscillator is inserted into an especially configured cavity in the housing's front face. The overall shape of the housing's exterior is aerodynamically configured from its rear to its front face in consideration of the fact that this housing will be mounted on an automobile's hood and in front of its windshield.

Figure 3:
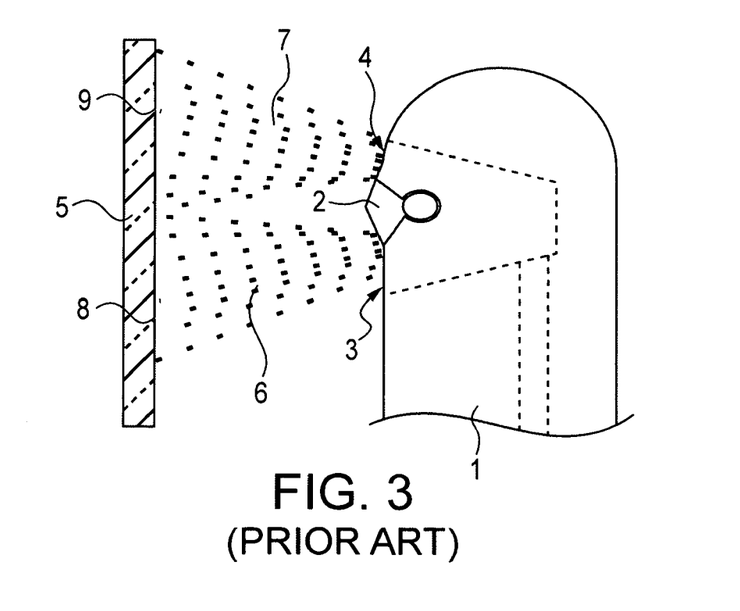

FIG. 3 from U.S. Pat. No. 6,062,491 (Hahn) shows a housing (1) that is notable for its having two cavities into which cooperating fluidic oscillators are inserted.

Figure 4A:
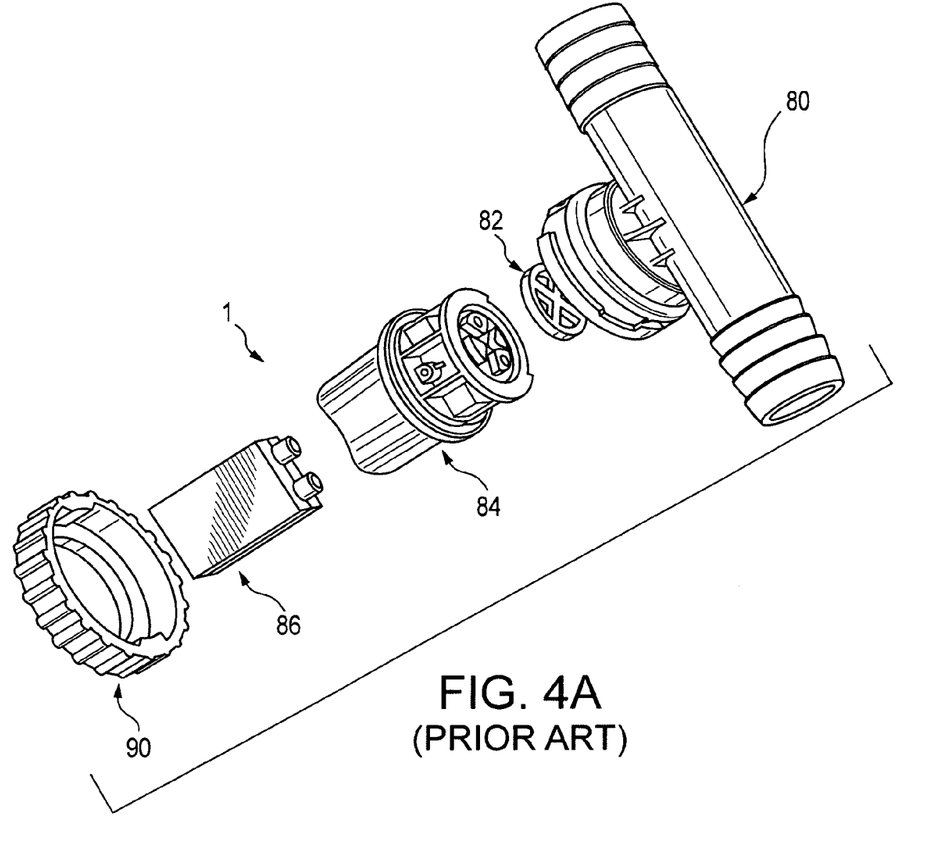
Figure 4B:
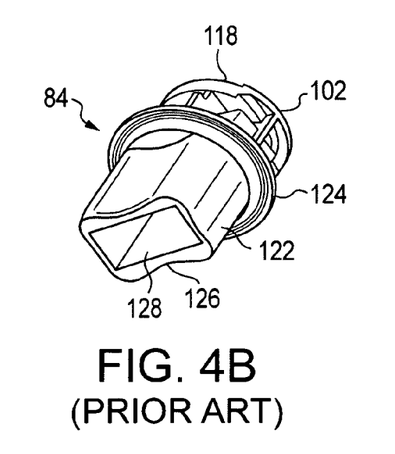

FIGS. 4A and 4B from U.S. Patent Publication No. (US-PPN) 2004-0227021 show a housing (84) whose exterior surface has been especially configured to allow this housing and its enclosed fluidic oscillator to be used as part of a "quick disconnect" nozzle assembly.

Figure 5:
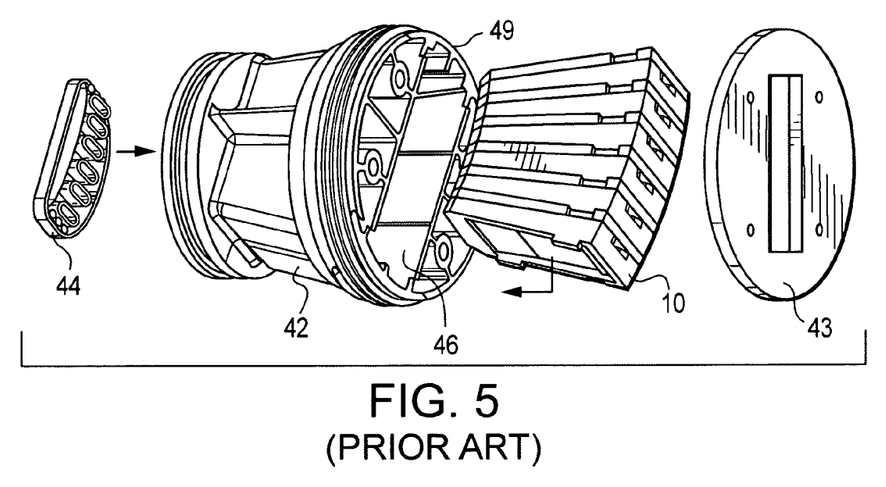

FIG. 5 from USPPN 2004-0164189, Ser. No. 10/673,727, shows a housing (42) which also has an exterior surface that has been especially configured to allow this housing to be used as part of a specialized nozzle assembly (i.e., a showerhead). It also has a cavity that is especially configured to accept a stack of fluidic oscillators (10) in which the centerlines of the adjoining oscillators have a specified, included angle of divergence.

Figure 6:
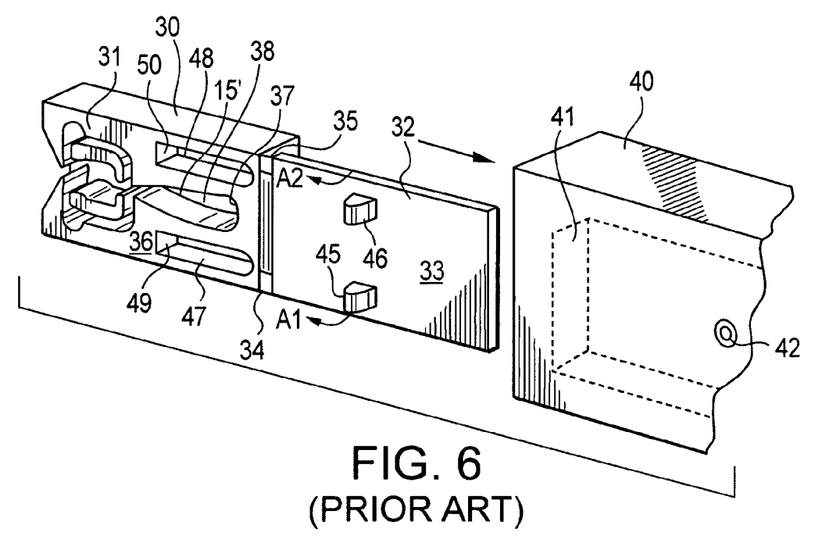
FIG. 6 from U.S. Pat. No. 5,845,845 shows a "lid" for enclosing only the boundary surface of the oscillator in which the fluidic circuit is located.
Figure 7A:
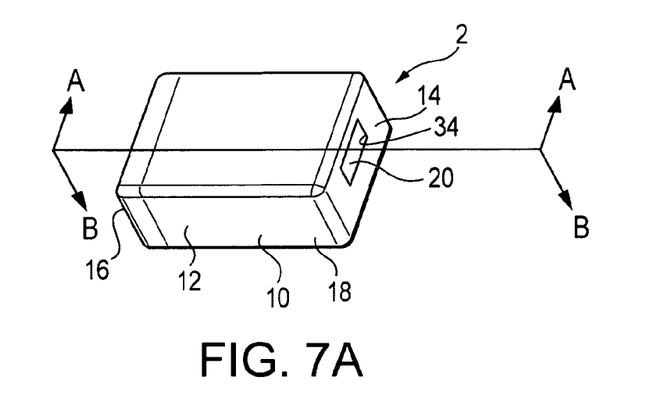
FIGS. 7A-7C show a perspective, top cross-sectional and side cross-sectional view of a first preferred embodiment of the present invention.
Figure 7B:
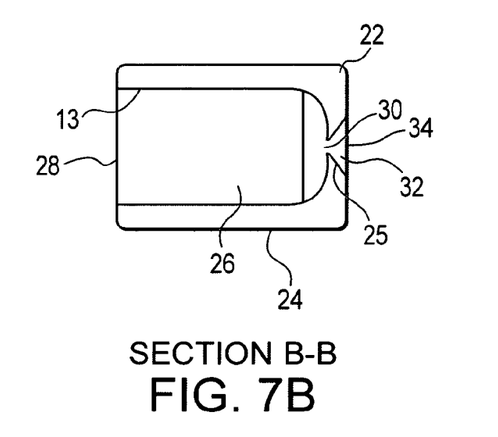
Figure 7C:
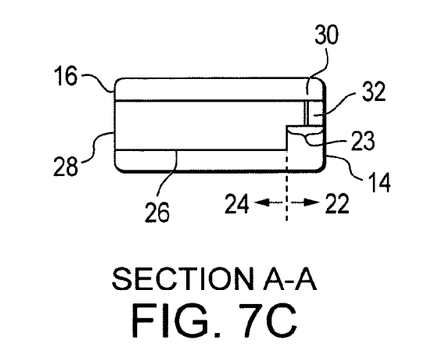
Figure 7D:
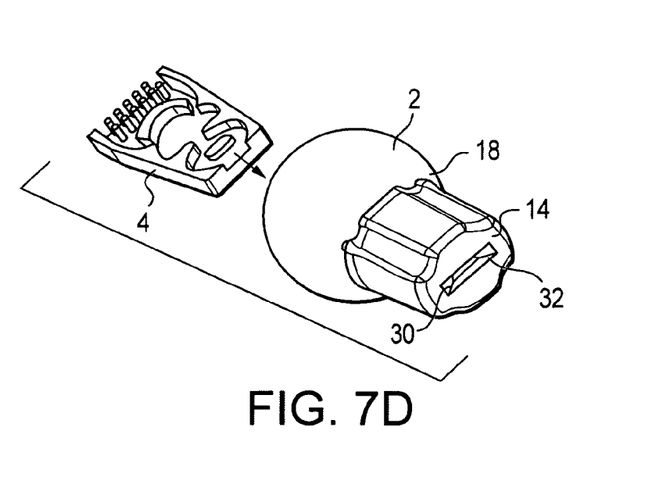
FIG. 7D shows a perspective view of a preferred embodiment of the present invention in the form of an enclosure for use in a "body spray" assembly.

While one generally thinks of the enclosures for these oscillators as being of an almost totally enclosing nature (in which case, we herein refer to them as housings), this need not be the case. FIG. 6 from U.S. Pat. No. 5,845,845 (Merke et al.) shows a "lid" (32) for enclosing only the boundary surface of the oscillator in which the fluidic circuit is located.

As fluidic oscillators have continued to be used in more types of applications, the opportunity has arisen to re-examine and improve upon the design of their enclosures as a way to improve upon the overall spraying performance of the nozzle assemblies, etc. which use fluidic oscillators.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide an assortment of individual housings or enclosures for fluidic oscillators that can be helpful in improving upon the actual spray performance of the spray devices or nozzle assemblies that utilize fluidic oscillators.

It is an object of the present invention to provide fluidic spray assemblies (i.e., fluidic oscillators with novel enclosures) that can provide specific types of desired sprays that have heretofore not been achievable with conventional fluidic technology. For example, to uniformly cover a relatively large surface area (e.g., a 400 cm area at a distance of 30 cm from the spray head's exit) with liquid droplets that have large diameters (e.g., >2 mm), high velocities (e.g., > or ~4 m/sec) and possibly pulsating frequencies that are in the range of perception by the human body (e.g., < or ~30-60 hertz).

It is an object of the present invention to provide improved and more versatile enclosures and fluidic spray assemblies that are ideally designed for shower head and body spray applications.

It is an object of the present invention to provide enclosures and fluidic spray assemblies that operate at low flow rates in shower head and body spray applications so as to yield significant water savings.

It is an object of the present invention to provide improved enclosures and fluidic spray assemblies that are ideally designed for an assortment of commercial cleaning applications.

It is an object of the present invention to provide enclosures and fluidic spray assemblies that can allow for reduced flow rates, while still yielding sprays that provide the same tactile sensations as they impact upon the skin of a user.

It is an object of the present invention to provide enclosures and fluidic spray assemblies that can allow for reduced energy consumption, while still yielding sprays that provide the same tactile sensations as they impact upon the skin of a user.

It is an object of the present invention to provide enclosures and fluidic spray assemblies that can make "less water" feel like "more water" (i.e., providing low flow rate sprays that provide the same tactile sensations as they impact upon the skin of a user).

It is an object of the present invention to provide enclosures and fluidic spray assemblies that prove to be ideally suited for shower massaging applications.

It is an object of the present invention to provide enclosures and fluidic spray assemblies that prove to be ideally suited for shower non-massaging applications.

It is an object of the present invention to provide enclosures and fluidic spray assemblies that allow a user to better direct and control the location of the areas being wetted by the sprays from such assemblies.

These and other objects and advantages of the present invention will become readily apparent as the invention is better understood by reference to the accompanying summary, drawings and the detailed description that follows.

SUMMARY OF THE INVENTION

Recognizing the need for the development of improved enclosures and fluidic spray assemblies to more effectively and efficiently provide a wider range of desired spray distributions, the present invention is generally directed to satisfying the needs set forth above and overcoming the disadvantages identified with prior art devices and methods.

In accordance with the present invention, and for those spray applications that use a fluidic oscillator of the type that generates a spray by having a pressurized liquid flow through the oscillator and exhaust into a gaseous surrounding environment, and where such an oscillator has a boundary surface which has fabricated into it a channel in the form of what is referred to herein as fluidic circuit, a preferred embodiment of an improved enclosure for this oscillator includes: a body having an interior and an exterior surface, wherein a portion of this interior surface is configured to attach to the oscillator boundary surface so as to form with the oscillator's channel an enclosed pathway through which the to-be-sprayed liquid may flow, and wherein a segment of this interior surface is configured so as to yield specified properties of the resulting spray.

In a second preferred embodiment, the enclosure's body is configured as a housing with: (a) its exterior surface including an outer surface that includes a front and a rear face and an intermediate boundary surface that connects these faces, (b) its interior surface includes a passage that extends between the faces, with this passage having a front and a rear section, and wherein: (c) the rear section of this passage forms a cavity having an opening in the body's rear face and is configured to allow for the insertion of the fluidic oscillator into the cavity, (d) the front section of this passage is configured so as to include the segment that influences the properties of the resultant spray, and (e) this segment includes an element chosen from the group consisting of a throat, a throat expansion region, a second interaction region or an island situated in the passage.

In a third preferred embodiment, the enclosure's body is configured as a "lid" with the portion of the interior surface having an upstream and a downstream end, and forming a surface that includes a plurality of planar parts, and wherein the planar part that is proximate its downstream end is sloped with regard to its adjoining upstream part so as to provide said interior surface with a slope angle that is in the range of 5 to 20 degrees.

Thus, there has been summarized above, rather broadly, the present invention in order that the detailed description that follows may be better understood and appreciated. There are, of course, additional features of the invention that will be described hereinafter and which will form the subject matter of the claims to this invention.

BRIEF DESCRIPTION OF THE DRAWINGS

FIG. 1 illustrates the two-dimensional, planar spray flow pattern yielded by an appropriately configured fluidic oscillator as disclosed in U.S. Pat. No. 4,151,955.

FIG. 2A illustrates the typical housing or enclosure for a fluidic oscillator that was developed for automotive windshield washing applications.

FIG. 2B from U.S. Pat. No. 5,820,034 shows a two-part, fluidic insert whose exterior surface is cylindrical so that it can be fitted into a similarly shaped housing.

FIG. 3 from U.S. Pat. No. 6,062,491 shows a housing that is notable for its having two cavities into which cooperating fluidic oscillators are inserted.

FIGS. 4A and 4B from USPPN 2004-0227021 show a housing whose exterior surface has been especially configured to allow this housing and its enclosed fluidic oscillator to be used as part of a "quick disconnect" nozzle assembly.

FIG. 5 from USPPN 2004-0164189 shows a housing which also has an exterior surface that has been especially configured to allow this housing to be used as part of a specialized nozzle assembly (i.e., a showerhead) having a cavity that accepts a stack of fluidic oscillators in which the centerlines of the adjoining oscillators have a specified, included angle of divergence.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

A common problem encountered in developing and producing fluidic oscillators or inserts for use in automotive windshield applications is designing a fluidic circuit which can give the desired spray characteristics (e.g., at flow rates of 400 ml/minute and operating pressures of 9 psig, uniform coverage with spray droplets of a target area located approximately 25 cm in front of the sprayer and having a target area width of approximately 80 cm) and which can be fitted into a housing which is very limited on its allowable size. Because such housings often are situated in locations on an automobile’s hood that are quite visible, their allowable dimensions are often dictated by aesthetic considerations (e.g., typical acceptable widths are on the order of 10-12 mm). The consequence of this is that the spray from the windshield washers situated in such housings must have, what is referred to as, a large horizontal fan angle, $\phi$ (i.e., as defined by the horizontal boundaries of the region wetted by the spray, see FIG. 1).

Since such inserts and their enclosures are typically made by plastic injection molding methods, those knowledgeable with such manufacturing methods will understand that such manufacturing methods impose further constraints on the geometry of such inserts and their enclosures. For example, a 12 mm wide housing can only accommodate a fluidic insert having a maximum width of about 9 mm since the wall thickness of such housings must typically be about 1 mm or larger.

In striving to improve the performance of various types of fluidic sprayers, we have discovered that there are significant opportunities to create and introduce new enclosures for these fluidic oscillators that appreciably improve their performance.

FIGS. 7A-7C show, respectively, a perspective, a top cross-sectional and a side cross-sectional view of a first preferred embodiment of the present invention. In this instance, the novelty of the present invention is being illustrated with an enclosure 2 whose outer boundary surface is generic in nature. This housing is seen to consist of a body 10 that has an outer boundary surface 12 that includes a front 14 and a rear 16 face and an intermediate boundary surface 18 that connects these faces. A passage or enclosed pathway 20 extends between these faces and has been constructed to have a clearly defined front 22 and rear 24 section or portion. The rear portion of this passage is configured to form a rectangular cavity 26 into which a rectangular-shaped fluidic oscillator 4 is to be inserted. The intersection of this cavity 26 with the body’s rear face 16 forms the opening 28 through which this insertion is accomplished.

It should be noted that this enclosure 2 is unique in that it allows for the rear loading of a fluidic insert. This can be especially important in various high pressure applications in which such frontally loaded inserts have been observed to be effectively spit from their housings due to excess pressure build-ups behind or upstream of the inserts.

The front portion 22 of this enclosure’s passage is also unique in that it is a segment 23 of the enclosure’s interior surface that has been configured so as to form another element of the to-be-inserted oscillator’s fluidic circuit—both a throat 30 element and a throat expansion region or element 32. Thus, the to-be-inserted fluidic oscillator that would be appropriate for use with this enclosure 2 would not have such elements and its length would therefore be expected to be shorter than the usual similarly-operating fluidic oscillator.

FIG. 7D shows an example of such an enclosure 2 which has a non-generic outer boundary surface 12 and which allows for the rear loading of a fluidic oscillator 4. In this example, the enclosure is for use in a “body spray” assembly which allows the enclosure’s spherical shaped rear portion to be held in a spherical shaped cavity that allows one to rotate the enclosure 2 so as to aim the direction of the jet of liquid 2 that issues from its throat 30.

We have found that constructing fluidic oscillators and their enclosures in this way can great simplify their fabrication and make it much easier to later modify them. We have also found that this arrangement allows for a broader range of geometries to be easily and conveniently fabricated into these pieces. For example, we have been able to fabricate these enclosures so as to have larger expansion angles in their throat expansion regions than could be fabricated into the top or bottom surface of the typical fluidic oscillator. The use of such larger angles has allowed us to produce oscillating sprays that have larger horizontal liquid spreading or fan angles, $\phi$, see FIG. 1

While this embodiment has shown only an enclosure with a front portion 22 that includes the fluidic circuit elements of a throat 30 and throat expansion region 32, it should be recognized that any of the other known elements of such circuits could have also been included in this front portion 22. For example, fluidic elements that could have been included include an island (see U.S. Pat. No. 4,151,955), a second interaction region (see U.S. Pat. No. 5,860,603), and a horizontal slot in the passage's top or bottom surface (see U.S. Pat. No. 5,971,301). Other possible elements for inclusion are disclosed later in this section.

In working to further improve upon the design of such enclosures, it was further discovered that these enclosure could be fabricated with many especially oriented and configured cavities in a single housing so as to use various unique arrays of fluidic oscillators to create a combined spray whose droplet flow characteristics were unique in comparison to those sprays that could be produced by any other known means.

For assorted showerhead applications, FIGS. 8A-8E show views of the front faces 14 of various multi-cavity enclosures or housings 2 that illustrate some of ways that it has been found to be beneficial to orient the outlets 34 for the fluidic-oscillator-holding passages/cavities contained in these enclosures. The frontal views of these enclosures also reveal that the perimeter of these housing front faces define circles, but it should be recognized that this is not important to the performance of such showerhead—what is important is the orientation and spacing between the enclosures' cavities.

FIGS. 8A-8D illustrate arrangements in which the outlets and their related cavities are equally-spaced and arranged on the sides of a various types of polygons (i.e., A—an octagon, B & C—a square, D—a triangle).

Figure 8A:
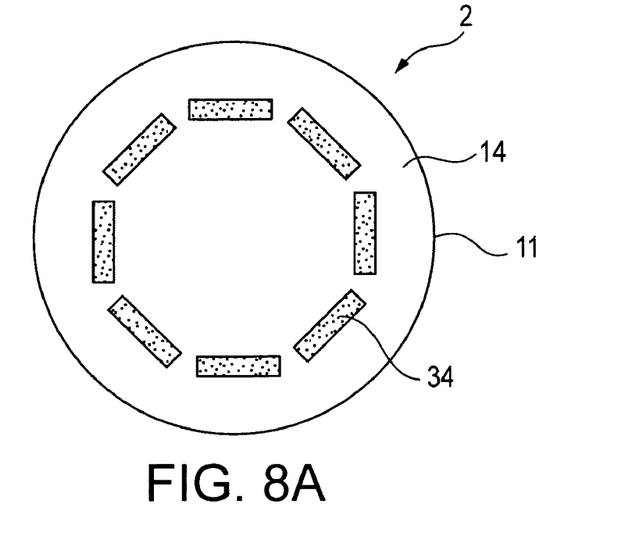
FIGS. 8A-8E show views of the front faces of various multi-cavity enclosures that illustrate additional embodiments of the present invention.
Figure 8B:
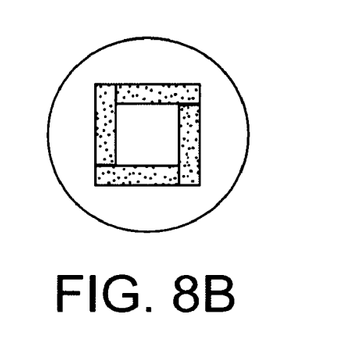
Figure 8C:
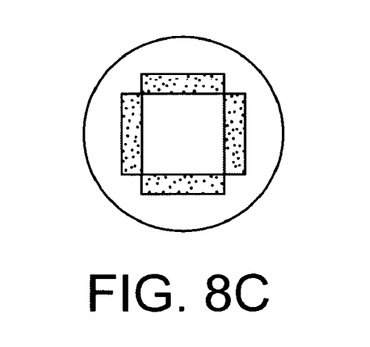
Figure 8D:
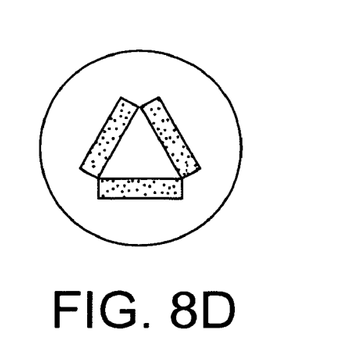
Figure 8E:
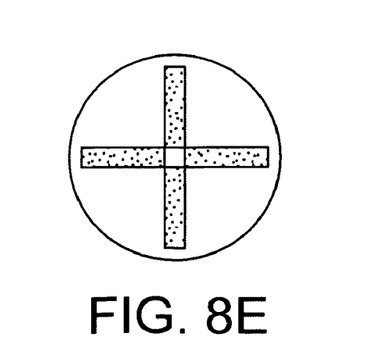

FIG. 8E illustrate an arrangement in which the outlets and their related cavities are equally-spaced and arranged on lines or spokes that spread out from the face's center (i.e., shown here in a four spoke arrangement, although other numbers of spokes could be used and should be considered to fall within the scope of the present invention).

To demonstrate how the discoveries of the present invention can be used to design a showerhead having a desired distribution of spray droplets, consider the following example. Suppose that it is desired to uniformly cover a surface area having dimensions of 35 cm×12 cm and which is located at a distance of 30 cm in front of a showerhead. Further, assume that the coverage is to be with droplets having a mean diameter of approximately 2 mm and an average velocity of approximately 4 m/sec. This is to be accomplished with a showerhead operating at 1.6 gpm at approximately 10 psi and having four or fewer orifices so as to make these orifices large enough to minimize the possibility that they will become clogged.

Until the teachings of the present invention, this task would have been virtually impossible since the known spray devices that could cover the targeted area cannot do so uniformly with droplets of the desired size and velocity. However, we have discovered that the above requirements can be met by utilizing a four-cavity enclosure similar to that whose front face is similar to that shown in FIG. 8C and whose cavities are sized so as to accommodate fluidic oscillators that employ fluidic circuits like those shown in U.S. Pat. No. 6,253,782.

Figure 9A:
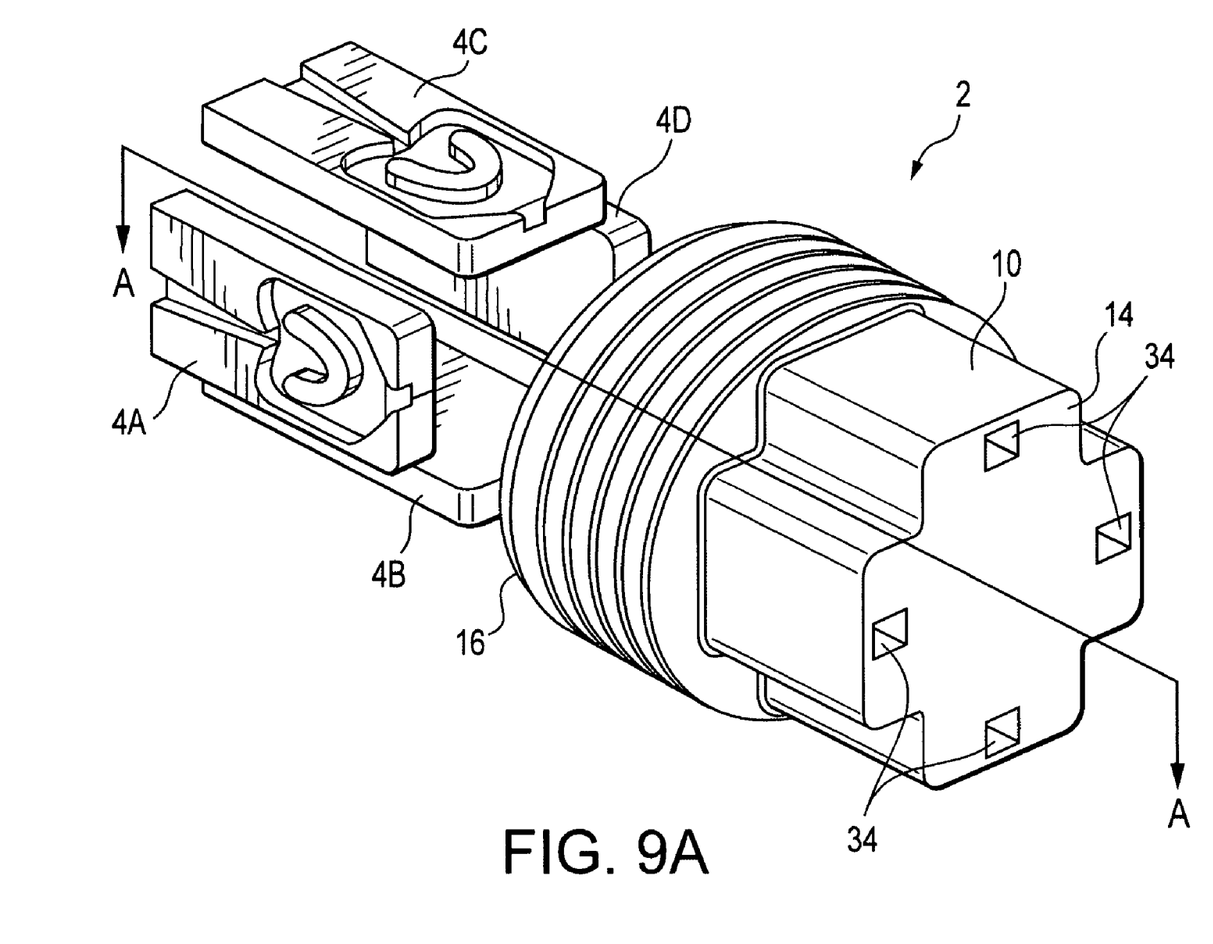
FIG. 9A shows a preferred embodiment of the present invention in the form of a housing that accommodates four fluidic oscillators.
Figure 9B:
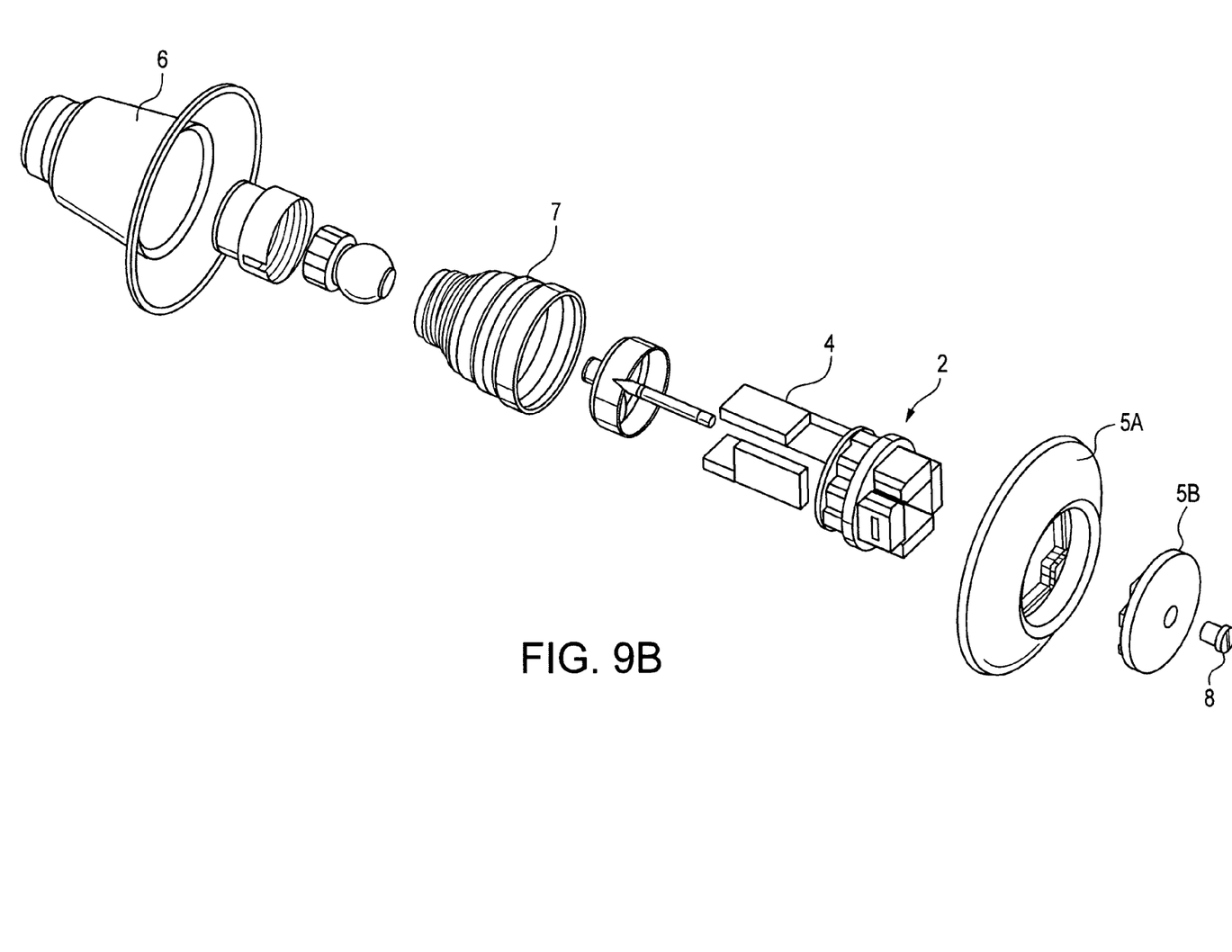
FIG. 9B shows an exploded view of the showerhead that utilizes the fluidic assembly shown in FIG. 9A.

FIG. 9A shows the body 10 of the actual enclosure 2 or housing used in this application. The four fluidic oscillators 4A-4D that are inserted into the openings in its rear face 16 are shown. The body's intermediate boundary surface is seen to be configured with a threaded region 36 so as to allow it to fit within and be mated to the surrounding parts (e.g., cosmetic front pieces 5A, 5B, a rear shell 6 piece, an adapter 7, a selector knob 8) that make up a complete showerhead. See FIG. 9B.

Figure 9C:
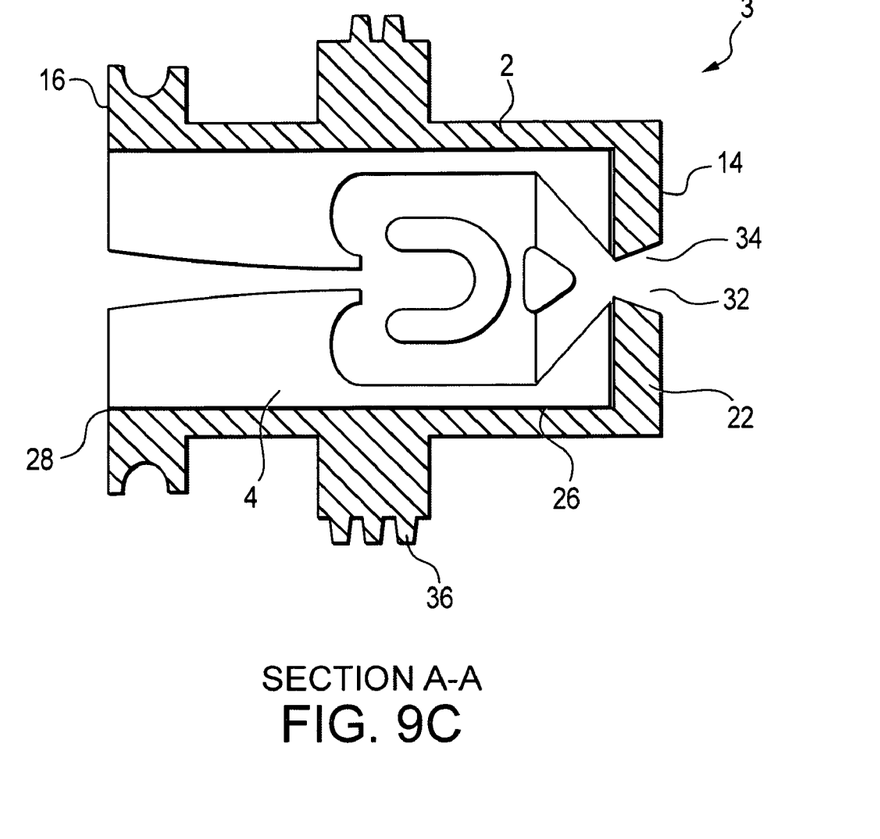
FIG. 9C shows a partial, downward-directed, cross-sectional view of the fluidic assembly shown in FIG. 4A.

FIG. 9C shows a partial, downward-directed, cross-sectional view of this fluidic assembly 3 (i.e., the enclosure 2 with one of its intended fluidic oscillators 4 inserted). In this embodiment, the front portion 22 of this body's passage is seen to have a throat expansion region 32 molded into it.

The fluidic oscillators that have been chosen for this application are observed to oscillate at a frequency of approximately 50 hertz and with the wavelength of these oscillations being approximately 10 cm. The result is a large area spray that, to the human touch, has very pleasing, vigorous (because of the relatively high velocity and large diameter of the droplets) massaging qualities.

Furthermore, this spray is achieved at surprisingly low flow rates (i.e., ranges of 1.2-1.9 gpm versus non-fluidic, spray heads operating in the range of 2.0-2.5 gpm) as compared to those used by the currently available, non-fluidic, massaging spray heads which cover significantly smaller surface areas.

With a wide range of fluidic circuits from which to chose and with many of these offering quite different flow characteristics, it would appear that there exists an almost infinite number of especially designed spray droplet distributions that can be achieved by utilizing enclosures or housings that have multiple, strategically oriented cavities.

To provide maximum design flexibility in the design of a showerhead using multiple fluidic oscillators, it should be recognized that the oscillators in these especially configured enclosures need not be all of the same kind. For example, oscillators with differing fan angles, oscillation frequencies, droplet sizes and velocities can be utilized together to yield an almost infinite number of sprays. All of these combinations are considered to be within the teachings of the present invention.

Figure 10:
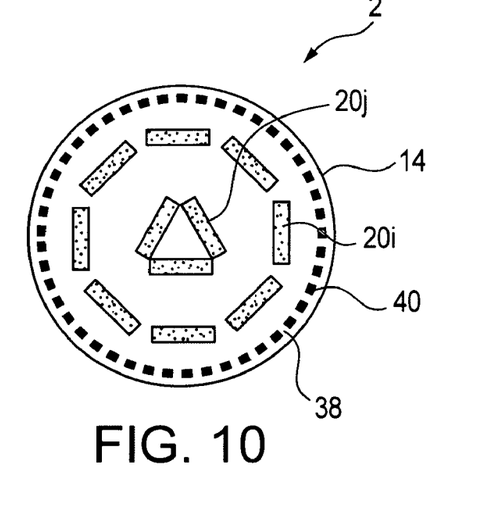
FIG. 10 shows the front face of a showerhead embodiment of the present invention that has multiple modes of operation.

Additionally, it can be noted that, using the teachings of the present invention, one can design a showerhead that has improved performance with multiple modes of operation. FIG. 10 shows the front face 14 of a multi-cavity enclosure 2 that allows for the multiple mode operation of any showerhead that uses such a fluidic assembly. The perimeter of this housing 2 is seen to have a ring 38 of conventional orifices 40 that emit a conventional, non-oscillating jet spray intended primarily for rinsing purposes. Within this ring there exists an octagonal array of eight fluidic-oscillator-containing passages 20i in which the oscillators that are inserted into these passages are also for rinsing purposes. Proximate to and within this array and surrounding the center of this face is a triangular array of three fluidic-oscillator-containing passages 20j whose inserted oscillators are intended for massaging purposes. By judiciously choosing the nature of the fluidic oscillators that are inserted into these passages, one can, as described below, improve the performance of such a multi-operating-mode showerhead.

Limited data suggests that most users of the conventional multi-operating-mode showerheads tend to keep their selector switches turned to only a single mode of operation, even when these users indicate that they would often prefer a mode of operation in which they were using a combination of the multiple modes available with such showerheads (i.e., a combination of rinsing and massaging sprays). This is apparently the situation because such combined modes of operation are reported to suffer from the problem of the inadequate spray velocities. This is believed to be due to the massaging spray outlets robbing water flow from the otherwise well performing rinse spray outlets. Both features perform well in their own right but when combined, both sprays suffer performance degradation.

The showerhead which utilizes the new enclosure illustrated in FIG. 10 is seen to overcome this problem of inadequate spray velocities. At standard operating pressures, the oscillators in the octagonal array of passages 20i yield, for rinsing purposes, spray velocities of about 6 m/sec in comparison to the orifices a conventional showerhead that yield 3.5-5.2 m/sec. Alternatively, these oscillators can operate at 1.6 gpm to yield spray velocities that conventional showerheads can only yield at flow rates of 2.5 gpm Meanwhile, the oscillators in the triangular array 20j yield, for massaging purposes, spray velocities of about 7.5 m/sec over an area of greater than 30 inches$^2$ as compared to the orifices of a conventional showerhead that yields 5.0-7.5 m/sec over an area of only about 5 inches$^2$. In a combined mode of operation, the octagonal array of passages 20i yield spray velocities of about 5 m/sec in comparison to the orifices of a conventional showerhead that yield less than 2.5 m/sec, while the triangular array 20j yield spray velocities of about 6.5 m/sec in comparison to the orifices of a conventional showerhead that yields less than 5.5 m/sec.

In addition to investigating possible improvements that can be made to fluidic assemblies by changing what we have previously described as "enclosures of an almost totally enclosing nature (i.e., housings)," we have also investigated the improvement that can be made in what we have previously referred to as the "lid" 42 for a fluidic oscillator 4. We have discovered that the rate at which the sprays emitted from such lidded oscillators spread, widen or thicken in the plane that is perpendicular to their central axis of flow can be greatly influenced by tapering the lid's surface which is in contact with the oscillator and near its outlet 4a.

Figure 11:
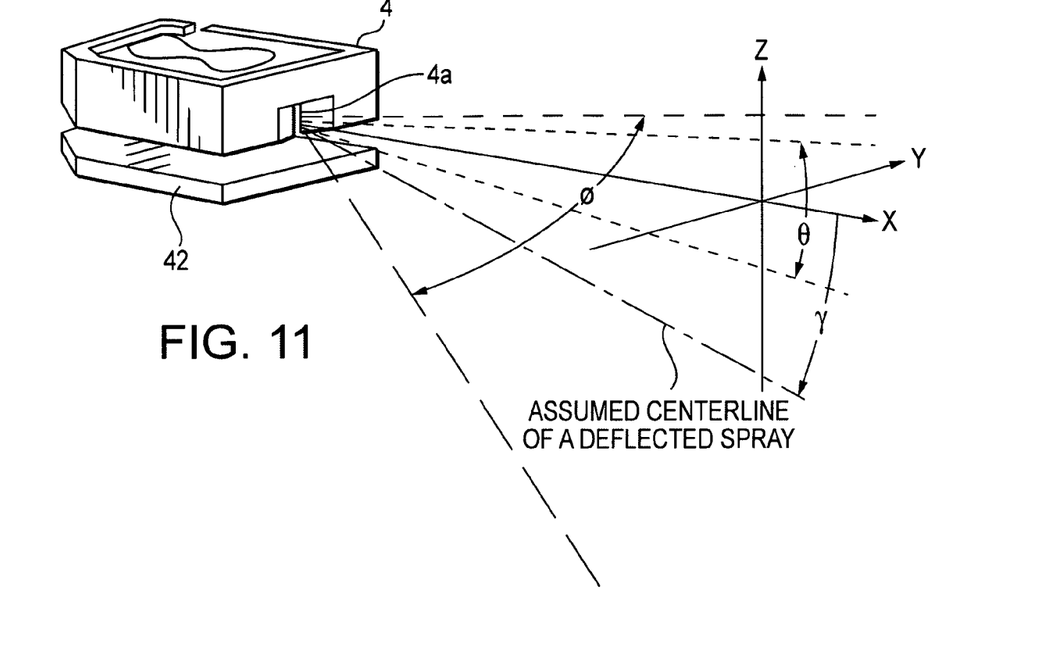
FIG. 11 illustrates the coordinate system which is being used herein to describe the spray from a fluidic oscillator.

See FIG. 11 which shows the coordinate system which is being used herein to describe such a spray (i.e., the centerline of the spray is in the x-direction and it exhibits both a spread in the x-y plane which is defined by its horizontal fan angle, $\phi$, and a vertical spread in the x-z plane which is defined by its vertical spread angle, $\theta$, or its "thickness.")

We have experimentally determined the degree that one can also use these changes in the lid's profile to cause the centerline of the spray to be deflected upward or downward from the oscillator's aim or x-direction, which, as shown in FIG. 11, is perpendicular to the surface which defines the oscillator's outlet. The amount of this deflection can be considered to be defined in part by the vertical deflection angle $\gamma$ that exists between this deflected spray's centerline and the x-y plane.

Figure 12:
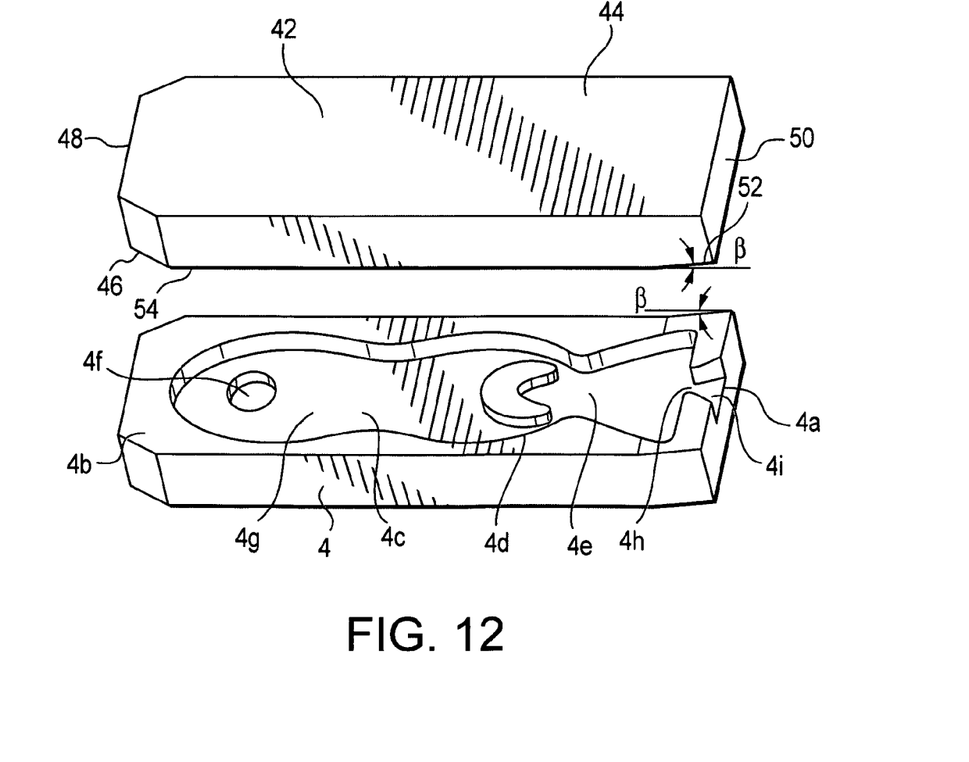
FIG. 12 illustrates a "lid" embodiment of the present invention being used with a complimentary fluidic oscillator.
Figure 13A:
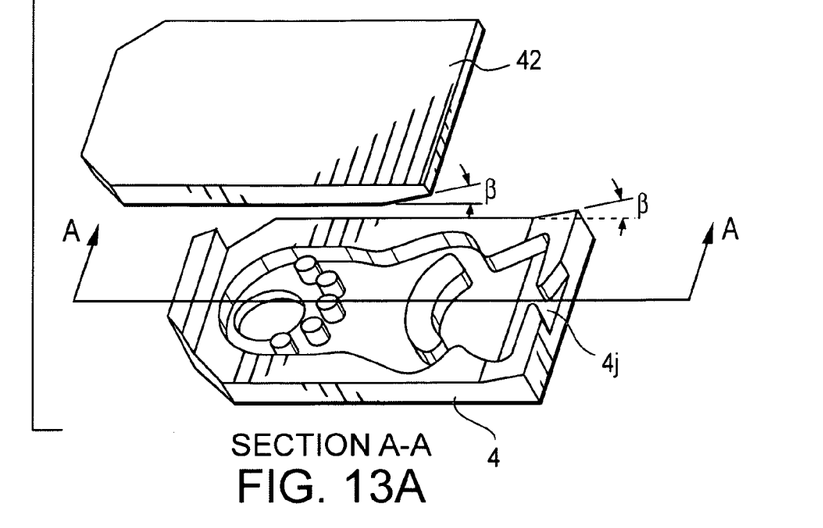
FIGS. 13A-13C show, respectively, a perspective, side and a side cross-sectional view of another preferred "lid" embodiment of the present invention.
Figure 13B:
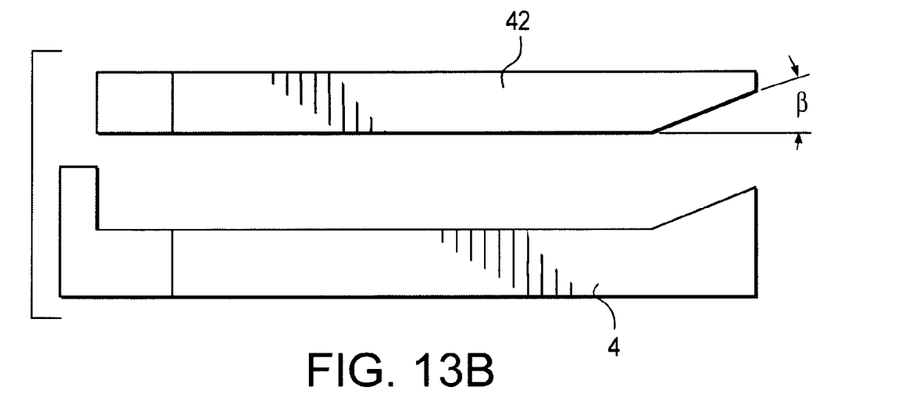
Figure 13C:
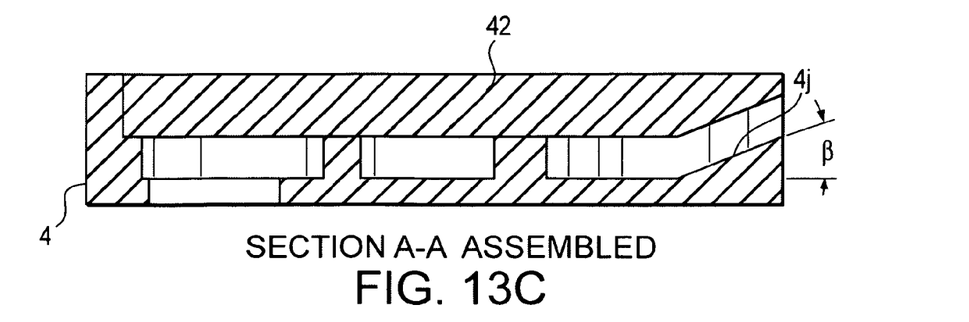

FIG. 12 illustrates a further embodiment of the present invention in the form of a lid 42 which has a planar exterior surface 44 and a planar-segmented interior surface 46. This interior surface gets its name because it is the surface that is to be attached to the oscillator's boundary surface 4b and which has fabricated into it the channels 4c through which the liquid flows through the oscillator. The other well known parts of this fluidic circuit can also be seen in FIG. 12: two power nozzles or means for inducing oscillations in the liquid that flows through them, 4d, an interaction chamber 4e where the flow oscillations are created that cause the resulting spray to be oscillating in nature, a liquid inlet 4f, a pathway 4g that connects the inlet and the power nozzles, and a throat 4h with its downstream expansion section 4i.

The lid 42 is seen to have an upstream 48 and a downstream 50 end. Its part or segment 52 which is proximate its downstream end is seen to be sloped upward at an angle of $\beta$ with regard to the plane defined by its adjoining upstream part or segment 54.

This taper or slope to the downstream end of this lid enhances the spreading or thickening of the spray which issue from an oscillator 4 that utilizes such a lid 42. To emphasize this point, we call this type of combination a "thickening" lid-oscillator combination. For a $\beta$=9 degree taper in the lid and a similar 9 degree taper in oscillator's boundary surface proximate its downstream end, it was found the spray from this oscillator could be caused to thicken much faster than one from a similar oscillator that had only the traditional, flat bottomed lid: the spray's vertical spread angle, $\theta$, was approximately 9 degrees as compared to the 1-2 degrees of spread that was observed on the spray from the oscillator that utilized the flat-bottomed lid. Lid tapers or slopes in the range of 2-15 degrees have proved effective in greatly increasing the downstream rate at which the spray from a wide assortment of fluidic oscillators spread or thicken.

From our experiments with such modified lids, we also found that it was possible to deflect such sprays while causing little change in their rates of thickening. FIGS. 13A-13C show, respectively, a perspective, side and a side cross-sectional view of a preferred embodiment of the present invention. To distinguish the FIG. 13 embodiment from that shown in FIG. 12, we call the FIG. 13 combination a "deflection" lid-oscillator combination.

This "deflection" lid-oscillator combination differs from the "thickening" lid-oscillator combination shown in FIG. 12 because the downstream portion of the floor 4*j* of the FIG. 13 oscillator's channel beneath the tapered portion of its lid 42 is given this same taper (e.g., $\beta$). As shown in FIG. 13C, this configuration provides the channel of the "deflection" lid-oscillator combination with a uniform depth (which was noted in the third paragraph of the section "Description of Related Art" as being the usual configuration for a fluidic insert or oscillator).

From the above noted difference, it directly follows that the downstream portion of the channel floor of the "thickening" lid-oscillator combination of FIG. 12 does not have a taper $\beta$ applied to its channel floor. Furthermore, it also follows that, when the downstream portion of this combination's oscillator's boundary surface turns upward to match the lid's taper while its underlying channel floor has no such applied taper, the depth of this downstream, underneath this tapered lid portion of oscillator's channel actually increases in magnitude (in contrast to the uniform depth channel shown in FIG. 13C).

The FIG. 13 "deflection" lid-oscillator combination of tapers has been found to yield sprays whose deflection angles $\gamma$ are approximately equivalent to the imposed taper angles $\beta$ for angles in the range of 5 to 30 degrees. Taper angles $\beta$ in the range of 2 to 45 degrees have been experimentally examined and found to be effective in controlling a spray's lateral spread. The use of such taper angles are considered to come within the scope of the present invention.

It should also be noted that such a nozzle could also be incorporated into the front portion of the housing shown in FIG. 7. Additionally, it should be noted that, if the oscillator's floor 4*j* were to have a taper less than that of the lid so that the depth of the oscillator's channel in this downstream portion were to be effectively increasing in magnitude in its downstream direction, the effect would be to increase the rate at which the spray thickens as it spreads downstream. Conversely, if the oscillator's floor 4*j* were to have a taper that is greater than that of the lid so that the depth of the oscillator's channel were to be effectively decreasing in magnitude in its downstream direction, the effect would be to decrease the rate at which the spray thickens as it spreads downstream. These embodiments could be referred to as, respectively, a "deflection and thickening combinations" or a "deflection and thickness-decreasing combinations."

While the above discussion is in terms of a lid having planar sections that therefore provide for an abrupt change in the lid's profile, it should be recognized that this need not be the case as the lid can be molded so as to have sections with smooth curves or curvature. Such embodiments are considered to fall within the disclosure of the present invention.

Figure 14A:
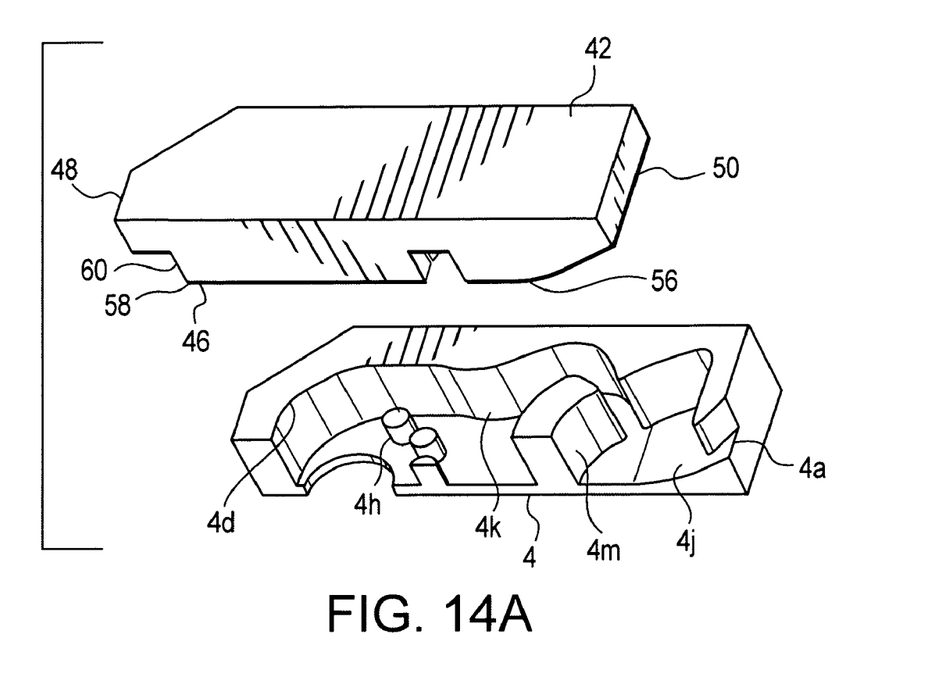
FIG. 14A shows a perspective view of a sectioned "interlocking lid" embodiment of the present invention.
Figure 14B:
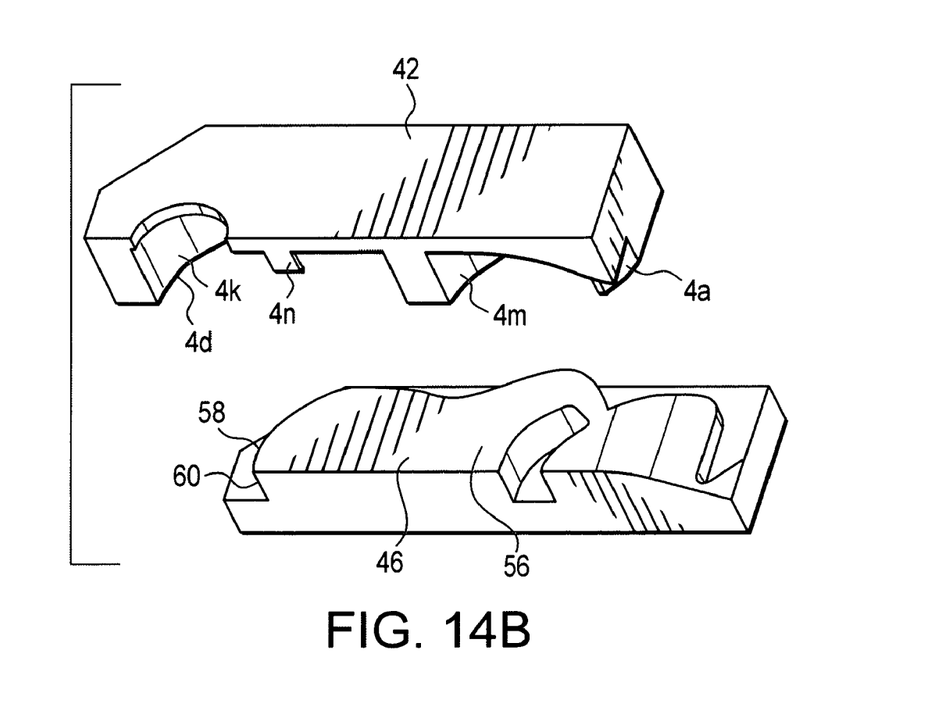
FIG. 14B shows the embodiment of FIG. 14A after it has been turned upside down so as to reveal the details of the lid's interior surface.

FIGS. 14A-14B show a perspective view of one side of a sectioned lid and oscillator that comprise another preferred embodiment of the present invention. FIG. 14B shows the elements of FIG. 14A after they have been rotated 180 degrees or turned upside down so that the details of the lid's interior surface are better seen.

This embodiment has been developed to provide a better means for sealing such lids to their appropriate oscillators. We refer to this assembly as being "interlockable" or "interlocking." It consists of a lid 42 whose interior surface is further contoured so as to have an elevated portion 56 that has a perimeter with a lid boundary edge 58 and an adjoining lid wall 60. This portion may also have cavities or protrusions that mate with correspondingly-shaped protrusions or cavities that are built into a fluidic oscillator's channeled boundary surface.

The oscillator's channel has a floor 4j and a wall 4k that extends from the floor and ends in at the channel's upper boundary edge 4l. These boundary edges 58, 4l are configured so as to allow at least a portion of the lid wall 60 to nest or interlock within the channel wall 4k so as to provide adjoining wall surfaces that can be used to create a liquid tight seal for the flow pathway that these elements create when they are interlocked. With this interlocking feature, it is no longer necessary to have such a precise fit between the outer surfaces of these elements and the interior surfaces of the cavity of any primary housing into which such a combination might be inserted so as to lock or orient this combination into its position of use.

In this embodiment, a barrier 4m in the oscillator's channel serves to form a power nozzle at each of its ends. This height of this barrier is greater than that of the filter posts 4n that are just upstream of it. Meanwhile, the lid's interior surface 46 is seen to have a barrier-accommodating cavity which accepts this barrier's additional height. In general, the portion of this lid's interior surface that sits right above the oscillator's channels has been made thicker than is customary, except for the barrier-accommodating cavity, so that it can project down into the oscillator's cavity so as to create, at this portion's or protrusion's edges, vertical extending surfaces along which the oscillator's flow channel can be sealed.

The foregoing is considered as illustrative only of the principles of the invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as hereinafter set forth in the claims.

We claim:

1. A fluidic lid-oscillator combination that operates on a pressurized liquid flowing through said combination to generate an oscillating spray of liquid droplets into a surrounding gaseous environment, said combination comprising:
   a fluidic oscillator having a boundary surface that has fabricated therein a flow channel with upstream and downstream ends, a specified depth and a means for inducing oscillations in said liquid that flows through said channel,
   a lid having an interior and an exterior surface, with said interior surface configured to attach to said oscillator boundary surface so as to form with said channel an enclosed pathway through which said liquid flows,
   wherein said lid interior surface having upstream and downstream ends,
   wherein a portion of said lid interior surface that is proximate said downstream end being sloped at a herein defined lid slope angle, $\beta$, with regard to said lid interior surface portion that is proximate said upstream end, and
   wherein the depth of the downstream portion of said oscillator channel that is beneath said tapered lid interior surface increasing in magnitude, relative to the depth of the upstream portion of said channel, in said channel's downstream direction.

2. The combination as recited in claim 1, wherein said lid slope angle, $\beta$, is in the range of 2 to 45 degrees.

3. A method of making a fluidic lid-oscillator combination that operates on a pressurized liquid flowing through said combination to generate an oscillating spray of liquid droplets into a surrounding gaseous environment, said method comprising the steps of:
   forming a fluidic oscillator having a boundary surface that has fabricated therein a flow channel with upstream and downstream ends, a specified depth and a means for inducing oscillations in said liquid that flows through said channel,
   forming a lid having an interior and an exterior surface, with said interior surface configured to attach to said oscillator boundary surface so as to form with said channel an enclosed pathway through which said liquid flows,
   wherein said lid interior surface having upstream and downstream ends,
   wherein a portion of said lid interior surface that is proximate said downstream end being sloped at a herein defined lid slope angle, $\beta$, with regard to said lid interior surface portion that is proximate said upstream end, and
   wherein the depth of the downstream portion of said oscillator channel that is beneath said tapered lid interior surface increasing in magnitude, relative to the depth of the upstream portion of said channel, in said channel's downstream direction.

4. The method as recited in claim 3, wherein said lid slope angle, $\beta$, is in the range of 2 to 45 degrees.

* * * * *